US012575480B2

(12) United States Patent
Gupta et al.

(10) Patent No.: US 12,575,480 B2
(45) Date of Patent: Mar. 17, 2026

(54) METHOD OF DETERMINING REMAINING SEED IN A PRODUCT DISTRIBUTION SYSTEM AND SYSTEM THEREOF

(71) Applicant: DEERE & COMPANY, Moline, IL (US)

(72) Inventors: Govind Kumar Gupta, Ahmednagar (IN); Dipesh Shende, Parbhani (IN); Sandeep Ekhe, Ahmednagar (IN); Pradeep Kale, Pune (IN); Elijah B. Garner, Bettendorf, IA (US)

(73) Assignee: Deere & Company, Moline, IL (US)

( * ) Notice: Subject to any disclaimer, the term of this patent is extended or adjusted under 35 U.S.C. 154(b) by 690 days.

(21) Appl. No.: 17/992,056

(22) Filed: Nov. 22, 2022

(65) Prior Publication Data

US 2023/0247935 A1      Aug. 10, 2023

Related U.S. Application Data

(60) Provisional application No. 63/307,225, filed on Feb. 7, 2022.

(51) Int. Cl.
| | |
|---|---|
| *A01C 7/10* | (2006.01) |
| *A01C 7/08* | (2006.01) |
| *A01C 21/00* | (2006.01) |

(52) U.S. Cl.
CPC .............. *A01C 7/105* (2013.01); *A01C 7/081* (2013.01); *A01C 21/005* (2013.01)

(58) Field of Classification Search
CPC ........... A01C 7/105; A01C 7/102; A01C 7/10; A01C 7/08; A01C 7/00; A01C 7/081; A01C 21/005; A01C 21/00
See application file for complete search history.

(56) References Cited

U.S. PATENT DOCUMENTS

| | | |
|---|---|---|
| 11,129,322 B2 | 9/2021 | Stanhope et al. |
| 2012/0036914 A1 | 2/2012 | Landphair et al. |
| 2016/0245678 A1 | 8/2016 | Yang |
| 2019/0387666 A1 | 12/2019 | Harmon |
| 2020/0245541 A1 | 8/2020 | Graham et al. |
| 2020/0245543 A1 | 8/2020 | Collins et al. |
| 2022/0361398 A1 | 11/2022 | Stoller et al. |

FOREIGN PATENT DOCUMENTS

EP          0998840 A2      5/2000

OTHER PUBLICATIONS

Extended European Search Report and Written Opinion issued in European Patent Application No. 23155244.9, dated Jun. 21, 2023, in 9 pages.

*Primary Examiner* — Christopher J. Novosad
(74) *Attorney, Agent, or Firm* — Taft Stettinius & Hollister LLP; Stephen F. Rost

(57) ABSTRACT

An agricultural work machine includes a frame and a tank coupled to the frame for storing a product. The tank includes a nozzle portion. A row unit is coupled to the frame and includes a hopper and a meter assembly. A product distribution line is coupled between the nozzle portion of the tank and the hopper. A blower is controlled to provide an air flow through the distribution line to transfer product from the tank to the row unit, and a mechanism located in the tank above the nozzle portion is controllable between an open position and a closed position. In the open position, the product in the tank flows through the mechanism into the nozzle portion, and in the closed position, the mechanism blocks the product in the tank from flowing into the nozzle portion.

14 Claims, 9 Drawing Sheets

500

Determine volume of
each meter, hopper
and hose based on
known dimensions ⟋502

Determine seed type
and seed size
from input ⟋504

Calculate quantity of
seeds in each meter,
hopper and hose ⟋506

Apply configuration
factor to quantity
of seeds ⟋508

Based on application
rate and seed
quantity, output area
to be planted ⟋510

700

Take initial tank
weight          702

Turn on blower          704

Fill hoses, hoppers
and meters until full          706

Measure tank weight          708

Determine weight of
seeds in hoses,
hoppers and meters          710

METHOD OF DETERMINING REMAINING SEED IN A PRODUCT DISTRIBUTION SYSTEM AND SYSTEM THEREOF

RELATED APPLICATIONS

This application claims the benefit of U.S. Provisional Patent Application Ser. No. 63/307,225, filed Feb. 7, 2022, the disclosure of which is hereby incorporated by reference in its entirety.

FIELD OF THE DISCLOSURE

The present disclosure relates to a planter machine, and in particular, to a method and system for determining an amount of seed remaining in a distribution system and planning the remaining seed in order to reduce cleaning efforts.

BACKGROUND

A conventional agricultural work machine such as a planter or seeding machine are used for dispensing product in a field. The type of product can be fertilizer, seed, chemical granulates, and the like. Following a work operation such as a planting, seeding, or fertilizing operation, the work machine is generally cleaned according to any conventional cleaning operation. Many conventional cleaning operations are done manually or at least partially manually. The cleaning operations can be difficult and time-consuming. It is often time-consuming and requires significant effort to remove product from distribution hoses, hoppers, meters, etc. Failure to do so, however, can cause damage to the various components of the machine.

Meter assemblies, for example, often need to be purged of product such as seed. To do so, the remaining or leftover product may be pneumatically discharged from the meter assemblies into containers such as bin bags. For machines that have a plurality of row units coupled thereto, the meter assembly on each row unit is purged of product following the work operation. Again, this can require a significant effort and is time-consuming.

Thus, there is a need for a better process of removing leftover product or finishing the work operation (e.g., planting, seed, fertilizing, spraying, etc.) with little or no product left in the row units.

SUMMARY

In one embodiment of the present disclosure, an agricultural work machine includes a frame; a tank coupled to the frame and configured to store a product, the tank including a nozzle portion; a row unit coupled to the frame, the row unit comprising a hopper and a meter assembly; a product distribution line coupled between the nozzle portion of the tank and the hopper; a blower operably controlled to provide an air flow through the distribution line to transfer product from the tank to the row unit; a mechanism located in the tank above the nozzle portion, the mechanism operably controlled between an open position and a closed position; wherein, in the open position, the product in the tank flows through the mechanism into the nozzle portion; wherein, in the closed position, the mechanism blocks the product in the tank from flowing into the nozzle portion.

In one example of this embodiment, the machine includes a plurality of row units coupled to the frame, where each row unit includes its own hopper and meter assembly; and a plurality of distribution lines for transferring product from the tank; wherein, each of the distribution lines is coupled between the nozzle portion and a respective one of the plurality of hoppers. In a second example, the machine includes a controller for operably controlling the blower and mechanism. In a third example, the nozzle portion is in fluid communication with the blower, the nozzle portion comprising an inlet and an outlet such that the air flow enters through the inlet, collects product in the nozzle portion, and transfers the product into the distribution line via the outlet.

In a fourth example, the controller comprises control logic which is executable by the controller to determine a total weight of product in the tank before performing a work operation; perform a first portion of the work operation by controlling the blower to transfer product from the tank to the row unit; determine how much product was used to complete the first portion of the work operation; and determine how much product remains in the distribution line, the hopper and the meter assembly after completing the first portion.

In a fifth example, a weight measuring device is in communication with the controller, the weight measuring device configured to measure the weight of product in the tank and communicate the weight to the controller. In a sixth example, a field map is disposed in communication with the controller, wherein the control logic is executable by the controller to determine from the field map a remaining area to be worked after the first portion of the work operation is completed.

In a seventh example, based on an amount of product remaining in the distribution line, the hopper and the meter assembly, the control logic is executable by the controller to determine a first area of the field which is workable by using only the remaining product in the distribution line, the hopper and the meter assembly; compare the first area to the remaining area; and control the mechanism to the closed position if the first area is the same as or less than the remaining area.

In an eighth example, the controller comprises control logic which is executable by the controller to calculate a total volume based on dimensions of the distribution line, the hopper and the meter assembly; receive an input related to a density of the product stored in the tank; determine a quantity of product based on the total volume and density; apply a predetermined configuration factor to the quantity of product; and determine an amount of product available in the distribution line, hopper and meter assembly.

In another embodiment of the present disclosure, an agricultural work machine configured to deposit a product on a field includes a frame; a tank coupled to the frame and configured to store the product; a row unit coupled to the frame, the row unit comprising a hopper and a meter assembly; a distribution line coupled between the tank and the hopper; a control system comprising a controller and control logic, the control logic being executable by the controller to perform a work operation of depositing the product on the field; and a blower operably controlled by the controller to provide an air flow through the distribution line to transfer product from the tank to the row unit; wherein, the controller operably executes the control logic to determine an amount of product in the distribution line, the hopper and the meter assembly at any given time.

In one example of this embodiment, the control logic is executable by the controller to determine an area of the field of which the work operation may be performed based only on the amount of product located in the distribution line, the hopper and the meter assembly. In a second example, a nozzle portion of the tank is disposed in fluid communication with the blower; and a mechanism located in the tank above the nozzle portion, the mechanism operably controlled between an open position and a closed position; wherein, in the open position, the product in the tank flows through the mechanism into the nozzle portion; wherein, in the closed position, the mechanism blocks the product in the tank from flowing into the nozzle portion.

In a third example, the controller determines the amount of product in the distribution line, the hopper and the meter assembly by executing the control logic by receiving a first product weight of the product in the tank from a tank scale before executing the work operation; after completing a first portion of the work operation, receiving a quantity of product deposited from the row unit via a sensor; determining a second product weight related to the quantity of product deposited from the row unit as a function of a density of the product; determining a third product weight based on a difference between the first product weight and the second product weight; receiving a current weight of the tank from the tank scale; and determining a remaining product weight based on a difference between the third product weight and the current weight, the remaining product weight being the weight of product located in only the distribution line, hopper and meter assembly.

In another example, the controller determines the amount of product in the distribution line, the hopper and the meter assembly when executing the control logic by controlling the mechanism to its closed position; receiving a first weight of the tank from a tank scale after product is loaded in the tank and the nozzle portion, the distribution line, the hopper and the meter assembly are substantially empty of product; controlling the mechanism to its open position to allow product to flow from the tank into the nozzle portion; activating the blower to transfer product from the nozzle portion through the distribution line into the hopper and meter assembly; once the hopper and meter assembly are full of product, receiving a second weight from the tank scale; determining the amount of product in the distribution line, the hopper and the meter assembly based on a difference between the first weight and the second weight.

In a further example, the controller determines the amount of product in the distribution line, the hopper and the meter assembly when executing the control logic by receiving a first weight of the tank from a tank scale after product is loaded in the tank and the distribution line, the hopper and the meter assembly are substantially empty of product; activating the blower to transfer product from the tank through the distribution line into the hopper and meter assembly; once the hopper and meter assembly are full of product, receiving a second weight from the tank scale; determining the amount of product in the distribution line, the hopper and the meter assembly based on a difference between the first weight and the second weight.

In yet a further example, the controller determines the amount of product in the distribution line, the hopper and the meter assembly when executing the control logic by calculating a total volume based on dimensions of the distribution line, the hopper and the meter assembly; receiving an input related to a density of the product stored in the tank; determining a quantity of product in the distribution line, the hopper and the meter assembly based on the total volume and density; and applying a predetermined configuration factor to the quantity of product.

In yet another example, the control system comprises a plurality of user controls disposed in communication with the controller, the plurality of user controls being controllable by a user to communicate at least one of an application rate, an instruction to control a valve or gate, an instruction to control the blower, a product type, a product density, and a product population; at least one sensor disposed in communication with the controller, the at least one sensor configured to detect a level of product in the hopper or when product is deposited from the row unit.

In another embodiment of the present disclosure, an agricultural work machine configured to deposit a product on a field includes a frame; a tank coupled to the frame and configured to store a product, the tank including a nozzle portion; a row unit coupled to the frame, the row unit comprising a hopper and a meter assembly; a distribution line coupled between the tank and the hopper; a control system comprising a controller and control logic, the control logic being executable by the controller to perform a work operation of depositing the product on the field; a mechanism located in the tank above the nozzle portion, the mechanism operably controlled by the controller between an open position and a closed position; a blower operably controlled by the controller to provide an air flow through the distribution line to transfer product from the nozzle portion to the row unit; and a sensor disposed in communication with the controller, the sensor configured to detect when the product is deposited from the row unit on the field; wherein, the controller operably executes the control logic to control the mechanism to its open position to allow product to flow from the tank into the nozzle portion; activate the blower to transfer product from the nozzle portion to the hopper and meter assembly until the hopper and meter assembly are full; control the mechanism to its closed position; begin the work operation of depositing seed on the field; receive a communication from the sensor each time product is not deposited from the row unit on the field during the work operation; receive from the sensor a total quantity of product deposited from the row unit when the number of times product is not deposited from the row unit satisfies a threshold number; and determine the amount of product in the nozzle area, the distribution line, hopper and meter assembly when full corresponds to the total quantity of product received from the sensor.

In one example of this embodiment, the controller stores the determined amount of product in the nozzle area, the distribution line, hopper and meter assembly in its memory. In a second example, during another work operation, the control logic is executable by the controller to control the mechanism in its closed position; receive a continuous count of product being deposited from the row unit via the sensor; and control the mechanism to its open position when the count is within a range or percentage of the total quantity of product.

In a further embodiment of the present disclosure, a method of determining an amount of product in a distribution assembly of an agricultural machine includes providing a tank, a controller, and the distribution assembly comprising at least one distribution line and at least one row unit; supplying the tank with the product; measuring a first weight of the product in the tank; performing a work operation by depositing the product on the field; determining a deposited weight of product during the work operation, the deposited weight corresponding to a weight of the product deposited on the field by the row unit during the work operation; determining a remainder weight of product in the tank and distribution assembly after the work operation; measuring a current weight of the tank; and determining an amount of product in the distribution assembly as a difference between the remainder weight and the current weight.

In one example of this embodiment, the determining an amount step comprises determining an amount of product in the at least one distribution line, a hopper of each of the at least one row unit, and a meter assembly of each of the at least one row unit. In another example, the method includes detecting the quantity of product deposited from the row unit via a sensor during the work operation. In a third example, the determining a deposited weight step comprises calculating the deposited weight as a function of the quantity of product deposited and a density of the product.

In a fourth example, the method includes controlling a blower via the controller to transfer product from the tank to the row unit via the at least one distribution line. In a fifth example, the method includes controlling a mechanism located in the tank between an open position and a closed position. In a sixth example, the method includes controlling the mechanism to the open position to allow product to flow from the tank through the mechanism to the at least one distribution line.

In a seventh example, the method includes controlling the mechanism to the closed position to limit product from flowing from the tank to the at least one distribution line. In an eighth example, the method includes determining a first area of the field that remains to be worked during the work operation based on a field map; determining a second area that is workable based on the amount of product in the distribution assembly; and comparing the first area to the second area. In a ninth example, the method includes closing a mechanism located in the tank to prevent product from flowing into the at least one distribution line when the first area is the same or less than the second area.

In yet another example of the present disclosure, a method of determining an amount of product in a distribution assembly of an agricultural machine, the machine including at least one row unit having a hopper and a meter assembly, the method includes providing a tank, a controller, and the distribution assembly comprising a distribution line, the hopper and the meter assembly; determining a total volume of the distribution assembly as a function of the dimensions of the distribution line, the hopper, and the meter assembly; determining a product total corresponding to how much product fills the total volume of the distribution assembly as a function of product type and size; applying a configuration factor to the product total; and determining the amount of product in the distribution assembly as a function of the configuration factor and the product total.

In one example of this embodiment, the configuration factor is less than 100%. In another example, the configuration factor is less than 25%. In yet another example, the method includes determining an area based on the amount of product in the distribution assembly.

In a further embodiment of this disclosure, a method of determining an amount of product in a distribution assembly of an agricultural machine, the machine including at least one row unit having a hopper and a meter assembly, the method includes providing a tank, a blower, and the distribution assembly comprising a distribution line, the hopper and the meter assembly; supplying the tank with the product; measuring a first weight of the tank supplied with product; controlling a mechanism to its open position to feed product from the tank into the distribution line; pressurizing the distribution line via the blower to transfer product through the distribution line to the at least one row unit; filling the distribution assembly with product; measuring a second weight of the tank with a portion of the product in the distribution assembly; and determining an amount of product in the distribution assembly as a function of the first weight and the second weight.

In one example of this embodiment, the method includes providing a nozzle portion of the tank located between the mechanism and the distribution line, the nozzle portion being separated from the tank when the mechanism is controlled to its closed position. In another example, the method includes calculating a volume of the nozzle portion based on its dimensions; wherein, the determining step comprises determining an amount of product in the nozzle portion as a function of the volume of the nozzle portion and a size of the product.

In another example, the method includes performing a work operation in a field having a total area; during the performing step, depositing product from the meter assembly on a first area of the field; determining a remaining area of the field corresponding to a difference between the total area of the field and the first area; determining a second area based on at least the amount of product in the distribution assembly; and comparing the remaining area to the second area. In yet another example, the method includes closing the mechanism when the remaining area is the same or less than the second area.

In yet a further embodiment of the present disclosure, a method of determining an amount of product in a distribution assembly of an agricultural machine, the machine including at least one row unit having a hopper and a meter assembly, the method includes providing a tank, a blower, and the distribution assembly comprising a distribution line, the hopper and the meter assembly; supplying the tank with the product; measuring a first weight of the tank supplied with product; pressurizing the distribution line via the blower to transfer product through the distribution line to the at least one row unit; filling the distribution assembly with product; measuring a second weight of the tank with a portion of the product in the distribution assembly; determining an amount of product in the distribution assembly as a function of the first weight and the second weight.

In an example of this embodiment, the method includes performing a work operation in a field having a total area; during the performing step, depositing product from the meter assembly on a first area of the field; determining a remaining area of the field corresponding to a difference between the total area of the field and the first area; determining a second area based on at least the amount of product in the distribution assembly; and comparing the remaining area to the second area. In another example, the method includes shutting off the blower when the remaining area is the same or less than the second area. In yet another example, the method includes using a field map to determine the remaining area of the field.

In an alternative embodiment of the present disclosure, a method of determining an amount of product in a distribution assembly of an agricultural machine, the machine including at least one row unit having a hopper and a meter assembly, the method includes providing a tank, a blower, a controller and the distribution assembly comprising a distribution line, the hopper and the meter assembly; controlling a mechanism to an open position to feed product from the tank into the distribution line; pressurizing the distribution line via the blower to transfer product through the distribution line to the at least one row unit; filling the distribution assembly with product; controlling the mechanism to a closed position to prevent product from flowing from the tank into the distribution line; depositing product on a field via the at least row unit during a work operation; sensing a quantity of product deposited on the field via a product sensor; detecting a total number of times product is not deposited on the field during the work operation; and comparing the total number of times to a threshold value.

In one example of this embodiment, the method includes determining a total quantity of product deposited on the field by the product sensor when the total number of times product is not deposited satisfies the threshold value. In a second example, the method includes associating the total quantity of product deposited as the amount of product in the distribution assembly. In a third example, the method includes controlling the mechanism to its open position when the total number of times satisfies the threshold value; refilling the distribution assembly with product; controlling the mechanism to its closed position; continuing to depositing and sensing steps; and opening the mechanism when the quantity of product deposited is within a predefined range of the amount of product in the distribution assembly. In another example, the predefined range is communicated to the controller via a user control.

In one embodiment of the present disclosure, a method of reducing an amount of product remaining in an agricultural planter after planting the product in a field, the agricultural planter having a tank, a controller, a blower, a row unit including a hopper and a meter assembly, and a distribution line, the method includes planting the product in the field by the agricultural planter; determining an amount of product located in the distribution line, the hopper and the meter assembly; calculating a first area that can be planted based on the amount of product located in the distribution line, the hopper and the meter assembly and a second area of the field that remains unplanted; comparing the first area to the second area; and determining whether to stop a flow of product from the tank to the distribution line as a result of the comparing step.

In one example of this embodiment, the method includes closing a mechanism located between the tank and the distribution line when the first area is the same as or greater than the second area. In another example, the method includes opening a mechanism located between the tank and the distribution line when the first area is less than the second area. In yet another example, the method includes sending an alert to a display when the first area is the same as or greater than the second area. In a further example, the method includes closing a mechanism located between the tank and the distribution line only when an instruction to do so from a user control is received by the controller. In yet a further example, the method includes shutting off the blower when the first area is the same as or greater than the second area.

In another example of this embodiment, the determining an amount of product step includes before the planting step, measuring a first weight of the product in the tank; determining a weight of product planted during the planting step; determining a remainder weight of product in the tank, distribution line, hopper, and meter assembly after the planting step; measuring a current weight of the tank; and determining the amount of product in the distribution line, hopper, and meter assembly as a difference between the remainder weight and the current weight.

In yet another example of this embodiment, the determining an amount of product step includes determining a total volume as a function of the dimensions of the distribution line, the hopper, and the meter assembly; determining a product total corresponding to how much product fills the total volume as a function of product type and size of the product; applying a configuration factor to the product total; and determining the amount of product in the distribution line, hopper, and meter assembly as a function of the configuration factor and the product total.

In a further example of this embodiment, the determining an amount of product step includes before the planting step, measuring a first weight of the product in the tank; controlling a mechanism located between the tank and the distribution line to its open position to feed product from the tank into the distribution line; pressurizing the distribution line via the blower to transfer product through the distribution line to the hopper and the meter assembly; filling the hopper and the meter assembly with product; measuring a second weight of the tank with a portion of the product in the distribution line, the hopper and the meter assembly; determining an amount of product in the distribution line, the hopper and the meter assembly as a function of the first weight and the second weight.

In yet a further example of this embodiment, the determining an amount of product step includes before the planting step, measuring a first weight of the tank supplied with product; pressurizing the distribution line via the blower to transfer product through the distribution line to the hopper and the meter assembly; filling the hopper and the meter assembly with product; measuring a second weight of the tank with a portion of the product in the hopper and the meter assembly; and determining an amount of product in the hopper and the meter assembly as a function of the first weight and the second weight.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
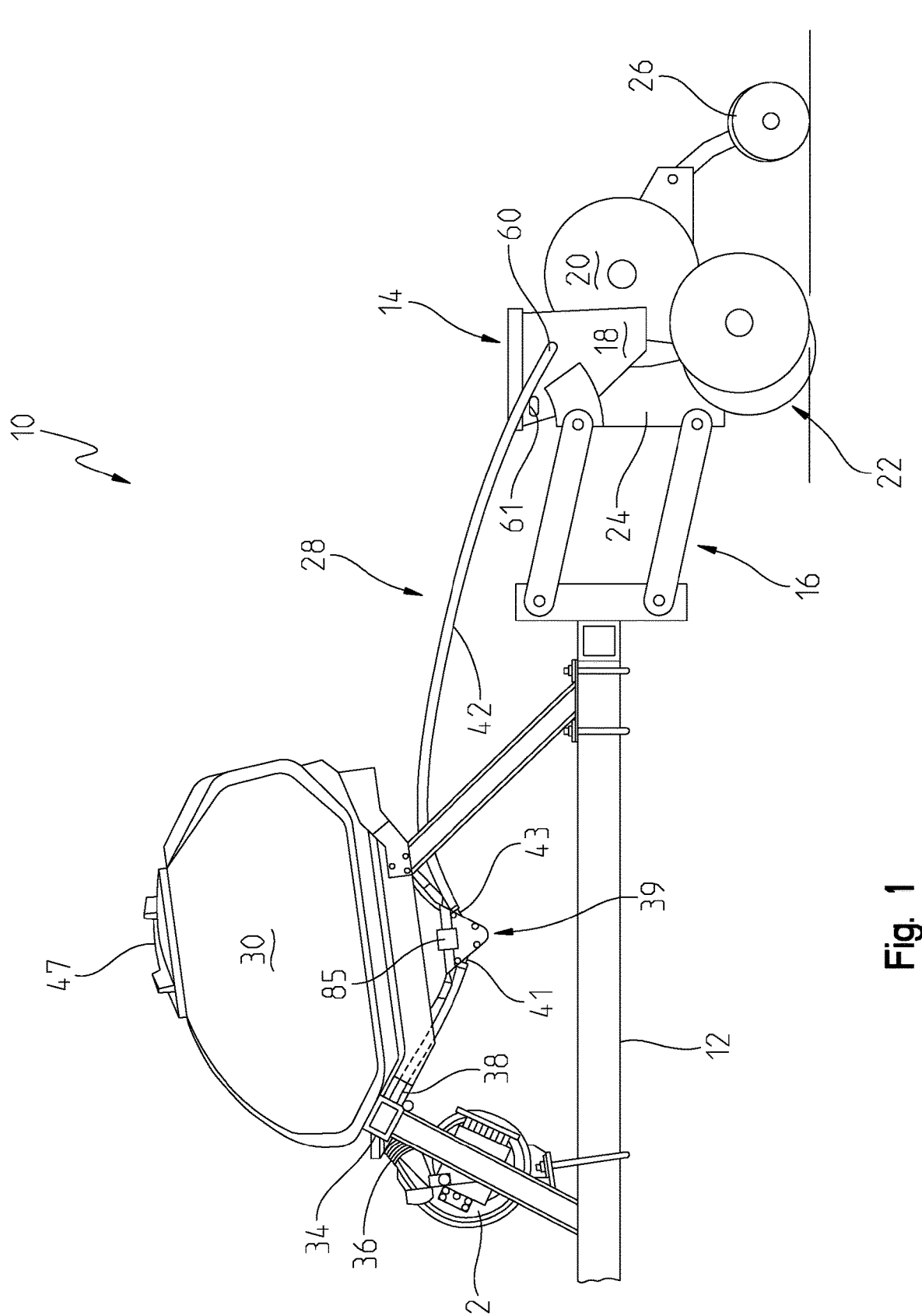
FIG. 1 is a schematic, side view of an agricultural work machine having a product distribution system.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

Following a planting, spraying or other similar operation, a user executes a cleaning operation to remove any product such as seed, fertilizer, chemical, etc. from a distribution system located on an agricultural machine. For instance, the distribution system may include a large hopper or tank that is filled with the product. The system may include one or more hoses that connect the tank to remote locations where the product is dispensed into or onto the ground or plants. For example, an agricultural planter machine may include one or more row units which include a secondary hopper and a metering system. A large distribution hose may connect the large hopper or tank to the secondary hopper on the row unit. During a planting operation, the product may be transferred from the tank to the secondary hopper via the distribution hose. The product may then be transferred from the secondary hopper to a meter where the seed is metered and later dispensed into the ground. A similar system may be utilized by sprayers and other machines that distribute product from a tank or primary hopper.

After the product is distributed, a user often cleans the tank, hoses, secondary hoppers, meters, etc. from any remaining product. At times, the remaining product can be significant. If the product remains in the tank, etc., it can damage the planter over time. This becomes more problematic when the machine includes multiple row units, for example. The cleaning process is generally a manual process, and it can be lengthy. A machine may include a meter purge functionality where unused product may be collected in bins or seed bags, but again this is primarily a manual process that is time-consuming.

Another disadvantage with leaving product in the distribution system is it can damage the row units. For example, it can be difficult to provide the meters in a water-tight configuration. Due to rain and other moisture, product such as seeds can be wet and begin to sprout if left in the row units. As a result, the meters can be damaged. It is also possible that rodents such as mice or other animals can get into the row units and cause damage.

Beyond these reasons, a user may need to remove any remaining product from the distribution system if the user desires to fill the system with a different type of product. For example, if the system has any remaining seed to plant corn, the user may need to clean the system before filling it with canola seed.

At the same, it is undesirable to run low on seed and possibly starve the meters while planting, for example. Thus, there is a need for a control process and system to ensure the proper quantity of product is in the distribution system of an agricultural machine to dispense the product in a field without running low or out of product, but at the same time use the amount of product in the system so that when a work operation (e.g., planting) is completed, the cleaning process is either unnecessary or takes less time.

Referring to FIG. 1 of the present disclosure, an embodiment of an agricultural work machine 10 such as a planter or seeder may include a frame 12 to which is mounted one or more planter or row units 14. In FIG. 1, only a single row unit 14 is shown, but it is to be understood that a plurality of row units 14 may be coupled to the frame 12 in a known manner. The row unit 14 may be coupled to the frame 12 by a parallelogram linkage 16 so that the row unit 14 can move up and down to a limited degree relative to the frame 12.

Each row unit 14 may include an auxiliary or secondary hopper 18 for holding product such as fertilizer, seed, chemical, or any other known product. In this embodiment, the secondary hopper 18 may hold seed. As such, a seed meter 20 is shown for metering seed received from the secondary seed hopper 18. A furrow opener 22 may be provided on the row unit 14 for forming a furrow in a field for receiving metered seed (or other product) from the seed meter 20. The seed or other product may be transferred to the furrow from the seed meter 20 by a seed tube 24. A closing assembly 26 may be coupled to each row unit 14 and is used to close the furrow with the seed or other product contained therein.

In one embodiment, the seed meter 20 is a vacuum seed meter, although in alternative embodiments other types of seed meters using mechanical assemblies or positive air pressure may also be used for metering seed or other product. As described above, the present disclosure is not solely limited to dispensing seed. Rather, the principles and teachings of the present disclosure may also be used to apply non-seed products to the field. For seed and non-seed products, the row unit 14 may be considered an application unit with a secondary hopper 18 for holding product, a product meter for metering product received from the secondary hopper 18 and an applicator for applying the metered product to a field. For example, a dry chemical fertilizer or pesticide may be directed to the secondary hopper 18 and metered by the product meter 20 and applied to the field by the applicator.

Referring to FIG. 1, the chassis or main frame 12 of the machine 10 may further support a main hopper or tank 30 and a blower or fan 32. The blower or fan 32 may be operably driven by a hydraulic motor. In another embodiment, however, other motor arrangements such as an electric motor and the like may be used. The blower or fan 32 can direct pressurized air to a manifold 34 through a main air hose or line 36. The manifold 34 may be formed from a hollow closed tubular support of the main frame 12 and is provided with a plurality of manifold outlets corresponding to the number of row units 14 mounted to the frame 12. In this embodiment, individual air supply lines 38 may extend from the manifold outlets and direct pressurized air from the manifold 34 to an upstream side of a nozzle assembly 39. The nozzle assembly 39 may be located at a lower or bottom portion of the main hopper or tank 30 as shown best in FIG. 2 of the present disclosure.

Figure 2:
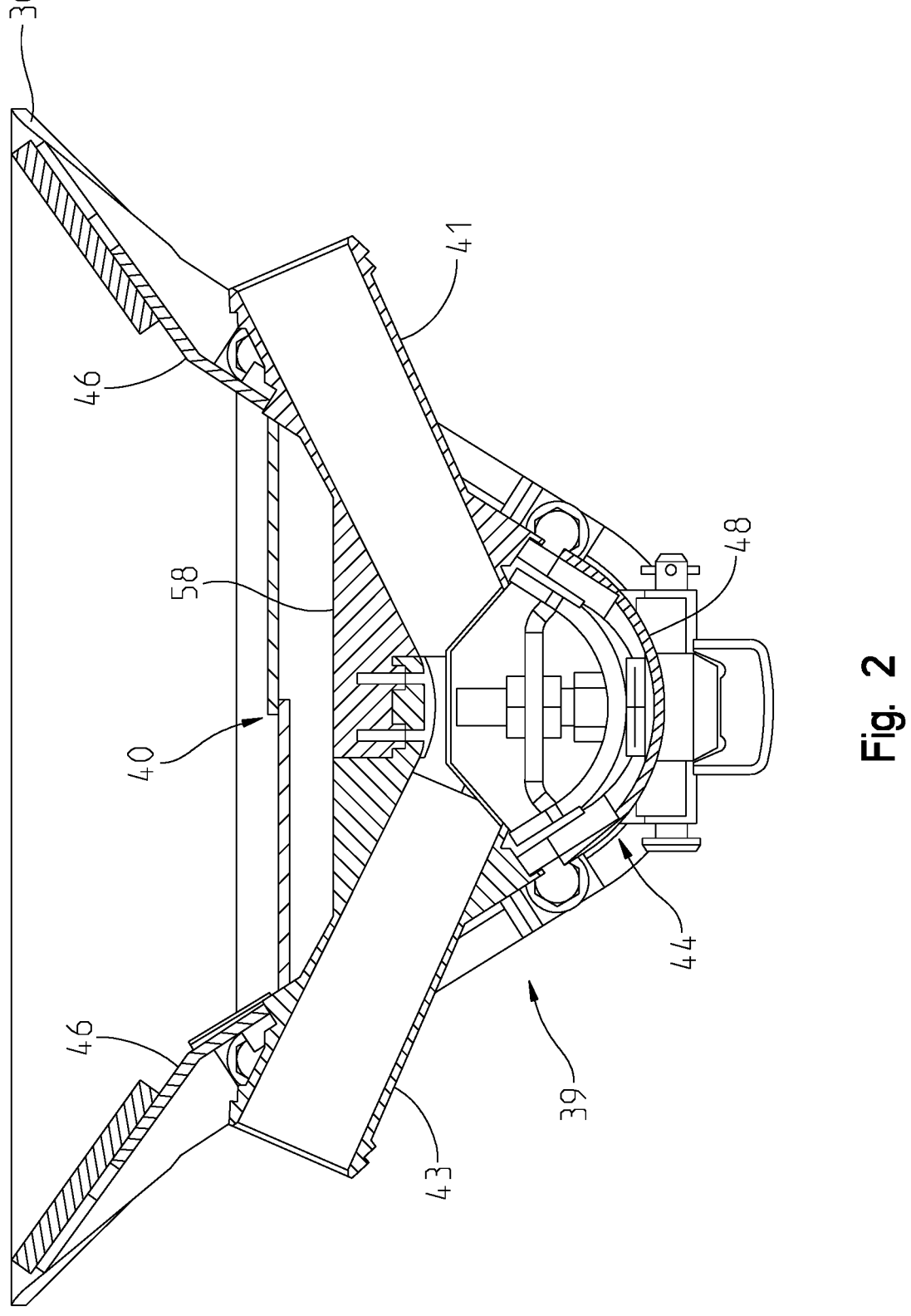
FIG. 2 is a side cross-sectional view of a nozzle assembly of the product distribution system of FIG. 1.

As product such as fertilizer or seed is deposited into the tank 30, the product flows by gravity to the nozzle assembly 39. The upstream side of the nozzle assembly 39 is provided with a number of air inlets 41 corresponding to the number of air supply hoses 38. The air inlets 41 may be spaced transversely along the upstream side of the nozzle assembly 39. The downstream side of the nozzle assembly 39 may be provided with a number of product outlets 43 corresponding to the number of air supply hoses 38. The product outlets 43 may also be spaced transversely along the downstream side of the nozzle assembly 39. The product outlets 43 lie opposite from the air inlets 41, as shown in FIG. 2. Each air inlet 41 is aligned with a respective product outlet 43. As shown in FIG. 1, distribution or product supply hoses 42 may be coupled to and extend from the product outlets 43 to the individual secondary hoppers 18 for directing product entrained in the air stream to the secondary hoppers 18.

Returning to FIG. 2, the nozzle assembly 39 may be provided with a concave bottom 44 having outwardly diverging sidewalls 46. Product in the form of seed or non-seed product is placed in the main hopper 30 through a lid 47. Portions of the nozzle assembly 39 can be opened to form a cleanout door 48.

The air inlet 41 may be angled downwardly relative to the concave bottom 44 and correspondingly the product outlet 43 may be angled upwardly relative to the concave bottom 44. An integral baffle 58 extends between the air inlet 41 and the product outlet 43. The baffle 58 may be located above the air stream passing from the air inlet 41 to the product outlet 43. The downwardly angled air inlet 41 prevents product from backing up into the air supply hose 38, whereas the upwardly angled product outlet 43 prevents product from flowing into and clogging the product supply hose 42.

Adjacent to the air inlet 41 and product outlet 43 combinations are transversely spaced from one another so that seed or non-seed product can pass on either side of the baffles 58 and puddle beneath the baffles 58. An air stream passing from the air inlet 41 to the product outlet 43 can collect product located in the puddle and directs it through a corresponding distribution or product supply hose 42 to the respective secondary hopper 18. The transfer of product from the tank 30 to the secondary hoppers 18 can be done automatically as product is needed by the secondary hopper 18. As an individual secondary hopper 18 fills up with product, an inlet 60 of the secondary hopper 18 becomes covered by product blocking and slowing the air stream so that the air stream no longer picks up product in the tank 30 and transports the product to the secondary hopper 18. Conversely, as product is metered by the product meter 20 and dispensed to the ground, the quantity of product in the hopper 18 begins to drop such that the inlet 60 can be uncovered. As this happens, the air stream from the blower 32 picks up product for delivery to the secondary hopper 18. In this way, the secondary hoppers 18 may be continuously and automatically provided with product on-demand so long as the blower 32 is running and product is available in the nozzle assembly 39. The side walls of each secondary hopper 18 may be provided with screen vents 61 for venting air pressure in the secondary hopper 18. The vent screens 61 can also be located in the lids of the secondary hoppers 18 as long as the vent screens 61 are above the respective product inlets.

As described above, a plurality of distribution hoses or product supply hoses/lines may run from each outlet 43 of the tank 30 to a respective row unit 14. One end of each hose is coupled to an outlet 43 and the opposite end thereof is coupled to an inlet 60 of the secondary hopper 18 on the row unit 14. During operation, each distribution hose 42 may only have a small portion of its volume filled with product. For instance, in one example, each hose 42 may have less than 15% of its volume filled with product. In another example, each hose 42 may have less than 10% of its volume filled with product. In a further example, each hose 42 may have 5% or less of its volume filled with product. The distribution hoses 42 are primarily geared to assist with transferring product from the tank 30 to each secondary hopper 18.

The machine 10 is configured to include a product distribution assembly 28 which can include the nozzle area 39 of the tank 30, each distribution hose 42, each secondary hopper 18, and each meter 20. At the conclusion of a planting operation, the aforementioned cleaning operation is particularly cumbersome as the nozzle area 39, each distribution hose 42, secondary hopper 18 and meter 20 is emptied of product.

In an effort to avoid the lengthy and cumbersome cleaning operation, it can be desirable to control the amount of product in the distribution assembly 28 so that the amount of product therein may be compared with the amount of product required at any given time to complete a desired work operation (e.g., planting, fertilizing, etc.). The amount of product in the distribution assembly 28 (e.g., distribution hoses, secondary hoppers, and meters) is known or can be determined, then depending upon other factors such as implement type, tank weight, hopper sizes, seed sensor data, and hose volume, via an algorithm which may be executable to determine an approximate number of seeds available for completing the work operation. For instance, with implement width and application rate, an amount of area that can be worked (e.g., planted, fertilized, etc.) may be determined. With the help of field map data, the remaining area to be worked in a field may also be determined. Once the remaining area to be worked is determined, it may be compared to the amount of area that can be worked based on the amount of product in the distribution assembly 28. When the two area values are approximately the same, it is desirable to shut off the flow of product from the tank 30 into the nozzle area 39 and use only the product that remains in the distribution assembly 28 (e.g., in the nozzle area 39, distribution hoses 42, secondary hoppers 18, and meters 20. The distribution assembly 28 may be referred to as the "product on demand system."

In order to shut off or stop the flow of product from the tank 30 into the nozzle area 39, a mechanism 40 such as an electronic gate, valve, etc. may be incorporated into the interior of the tank 30. The mechanism 40 may be controlled manually or automatically. The mechanism 40 may be controlled mechanically, electrically, pneumatically, or any combination thereof. In one example, a user may control actuation of the mechanism 40 via a control element in a cab of the machine or other remote location. Alternatively, an algorithm or control logic may be executed to determine when to actuate the mechanism 40 in an automated manner. Further, a user may manually actuate the mechanism 40 to close off the nozzle area 39 from the rest of the tank 30.

With the mechanism 40 closed, the blower or fan 32 may continuously operate to provide an air flow through the nozzle area 39 and distribution hoses 42 to remove product therefrom. In this way, product remaining in the distribution assembly 28 (i.e., the nozzle area 39, distribution hoses 42, secondary hoppers 18, and meters 20) may be planted or otherwise dispensed from each row unit 14 without pulling any product from the tank 30.

Similarly, and as will be described in further detail below, a user may elect not to actuate the mechanism 40. An algorithm or control logic may evaluate the area to be planted, for example, and compare it to the quantity of product in the distribution assembly 28 such that a message or other alert may be communicated to the user requesting an instruction from the user as to whether to actuate the mechanism 40 or not.

It is also possible for a hopper product percentage to be input by the user into a display or other user control such that the user is able to set a desired amount of remaining seed in the distribution assembly 28 following a work function such as planting, fertilizing, spraying, etc. In this example, the user may use experience and his or her own confidence in setting this percentage value. Thus, in one example, if a control system on the machine determines that the amount of product in the distribution assembly 28 is capable of planting 10% of the field and the user desires to have enough product remaining in the distribution assembly following a planting operation to still plant 5% of the field, then the control system can actuate the mechanism 40 so that product in the distribution assembly 28 is used to plant 5% of the field and the other 5% remains in the distribution assembly 28 after the planting operation.

In another example, the user may desire to have a certain weight of seed or other product remaining in the distribution assembly 28 following a planting operation. In the same way, the control system may be capable of determining the weight of seed in the distribution assembly 28 and how much seed or product can be planted such that the desired weight of product remains in the distribution assembly 28 following the planting operation. In yet another example, the user may desire to have enough product to plant a desired acreage or area of a field remaining in the distribution assembly 28 following a planting operation. In this example, the control system may determine how much product is currently in the distribution assembly and how much area at a given rate the sum of product may plant. During the planting operation, the control system can actuate the mechanism 40 so that the product left in the distribution assembly 28 corresponds to the desired acreage or area set by the user. In yet a further example, the user may set a desired seed volume as a percentage of the distribution assembly volume, and the control system can similarly control the mechanism 40 to ensure that the desired seed volume remains in the distribution assembly 28 following the planting operation.

In some embodiments, the mechanism 40 such as a valve may not be provided in the tank 30. In one such embodiment, a user may shut off the blower or fan 32 so that the air flow through the distribution hoses 42 is stopped. Alternatively, the control system may execute an algorithm or control logic and automatically shut off the blower or fan 32. In these latter examples, shutting off the blower or fan 32 may still allow product in the secondary hoppers 18 and meters 20 to be emptied, but it may not entirely prevent seed from falling out of the tank 30 into the distribution hoses. Further, without the blower 32 running, seed in the distribution hoses 42 cannot be transferred to the row units 14. Thus, there may be a relatively small amount of product remaining the hoses when the blower 32 is shut off.

In some instances, a user may simply want to switch from one type of product to another (e.g., switch from planting beans to corn). In this way, the utilization of a mechanism 40 such as a valve may be useful for preventing product from flowing from the tank 30 into the nozzle area 39. Once this flow is shut off, the volume of the nozzle area 39 may be known and the quantity of product in the distribution assembly 28 may be calculated or estimated in order to determine the area of a field that can be planted only with the product remaining in the distribution assembly 28.

This process of using the product that remains in the distribution assembly 28 is desirable for several reasons. However, it is also desirable to ensure the meters 20 do not run empty on product during a work operation such as planting. So, steps can be implemented in the control process to allow for a sufficient quantity of product in the distribution assembly 28 without running empty during the work operation, but also minimizing the quantity of product remaining after the work operation is completed.

Figure 3:
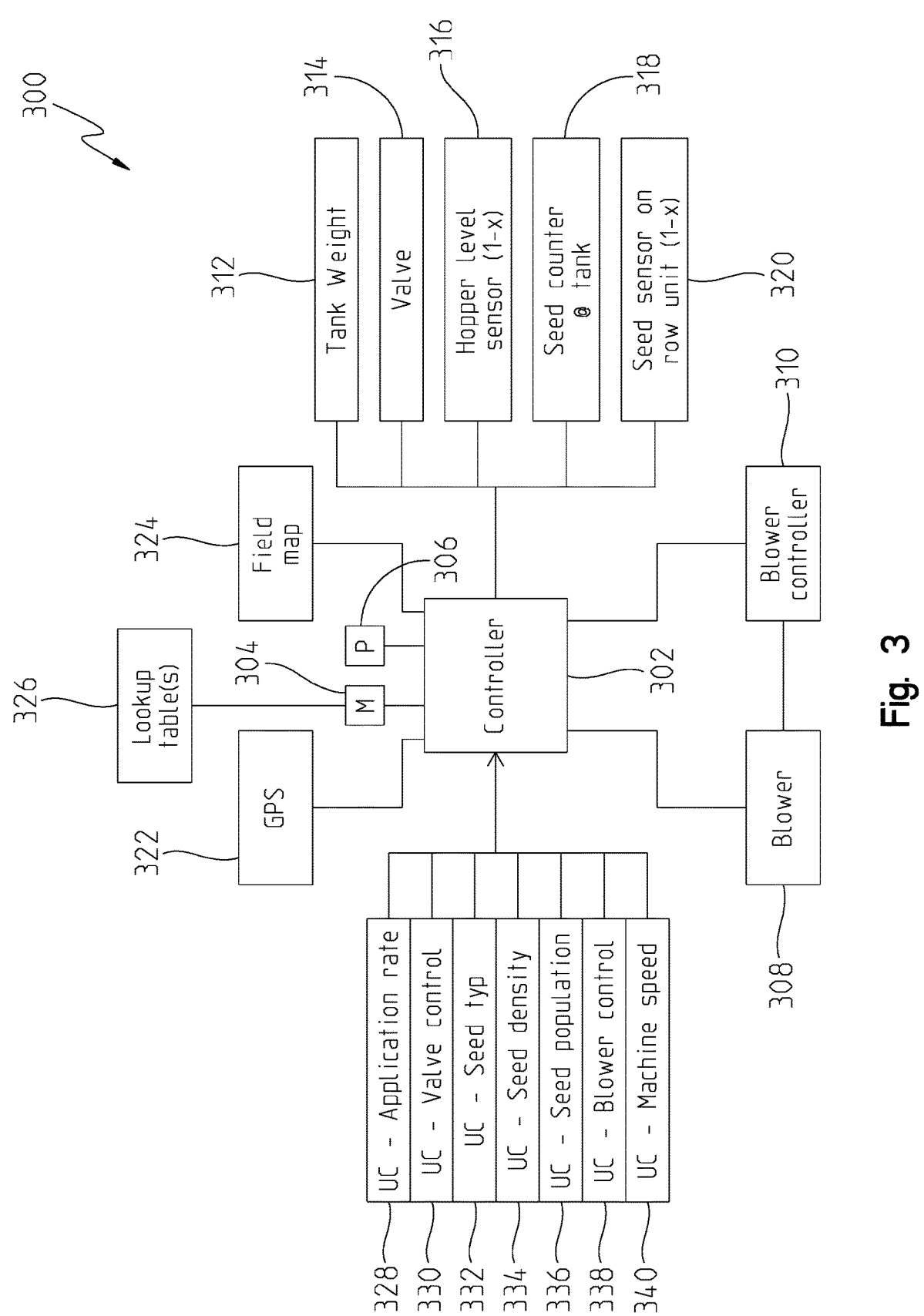
FIG. 3 is a schematic of a control system of an agricultural work machine.

To better understand how these processes can be executed, one embodiment of a control system 300 for executing the aforementioned processes is shown in FIG. 3.

The control system 300 may include a controller 302 having a memory 304 and a processor 306. The memory 304 may include an algorithm or control logic stored therein which is executable by the processor 306.

The controller 302 may include a plurality of inputs and outputs. As shown, the controller 302 may be in communication with a blower 308 similar to the blower or fan 32 in FIG. 1. The controller 302 may be capable of activating or deactivating the blower 308. The blower 308 may have its own blower controller 310 as shown. The blower controller 310 may be in communication with the controller 302 and/or the blower 308.

In FIG. 3, the control system 300 may include a global positioning sensor (GPS) 322 capable of detecting a location of the work machine in a field and providing location data to the controller 302. In the same way, the controller 302 may receive data from a field map 324 to determine how much area of the field is planted or remains to be planted. One or more lookup tables 326 may be stored in the memory 304 of the controller 302 to provide additional data necessary for the controller 302 to execute one or more of the processes disclosed herein.

The controller 302 may be configured to receive input data from a plurality of sensors. For example, a load cell or scale 312 may provide a weight of the tank 30 to the controller 302. The initial weight of the tank 30 may be known, but once it is filled with product, the load cell or scale 312 may provide a new weight of the tank 30 to the controller 302.

As described above, the tank 30 may include a mechanism 40 such as a valve 314 for opening or closing the nozzle area 39 of the tank 30 from the remainder of the tank. With the valve 314 closed, product in the tank is unable to flow into the nozzle area 39 as previously described. In one embodiment, the valve 314 may be electrically controlled by the controller 302 to actuate between an open position and a closed position. For sake of this disclosure, product is unable to flow into the nozzle area 39 from the tank 30 when the valve 314 is in its closed position.

In one embodiment, each secondary hopper 18 may include a sensor 316 capable of detecting a level of product in the hopper 18. There be a sensor 316 for each hopper 18, or in some embodiments a single sensor 316 may be capable of detecting a level of product in two or more hoppers 18.

The tank 30 may also include a sensor 318 capable of detecting or counting the quantity of product flowing into the nozzle area 39 or through one of the outlets 43. The sensor 318 may be in communication with the controller 302 to provide an accurate quantity of seed or other product entering the distribution assembly 28.

Moreover, each row unit 14 may include a sensor 320 capable of detecting or counting product as it is metered by the meter 20 and deposited in the field. The sensor 320 may be in communication with the controller 302 so that the controller 302 can accurately determine how many seeds or product has been planted, for example. For x number of row units, the control system 300 may include x number of hopper level sensors 316 and seed sensors 320.

The control system 300 of FIG. 3 may include a plurality of user controls as well. For example, in one embodiment, a first user control 328 may allow a user to input an application rate to the controller 302. The application rate may be defined in terms of weight or mass per acre, for example. Other types of application rates may be input as well, and a user may select which type of application rate to input.

A second user control 330 may allow a user to operably control the mechanism 40 or valve 314. Here, the user may use the control 330 to command the controller 302 to either open or close the valve 314, for example.

A third user control 332 may allow a user to input a seed or product type to the controller 302. The seed or product type may be selected from a list of different seeds or products. Alternatively, the user may use a keyboard-like feature to input the seed type. The user may be able to input a size of the seed including length, diameter, etc. to the controller 302. In any event, the controller 302 may use the product type for better estimating or determining how much product is in the distribution assembly 28.

A fourth user control 334 may allow a user to input a seed or product density to the controller. The product density may be used by the controller to determine a quantity of product or seeds in the tank 30 or distribution assembly 28. Alternatively, seed or product density may also be input via the third user control 332 when inputting the seed or product type.

A fifth user control 336 may allow a user to input a product or seed population for a given area to the controller 302. For example, if the user desires to plant 1,000 seeds per acre of one seed type and 2,500 seeds per acre of a different seed type, the user may input this information to the controller 302 via the fifth user control 336.

A sixth user control 338 may allow a user to operably control the blower 308. For instance, the user may send a command to turn on or off the blower to the controller 302. In turn, the controller 302 may communicate directly to the blower 308 or the blower controller 308 to turn on or off the blower 308.

A seventh user control 340 may be actuated by a user to control machine speed in the field during the work operation. The machine speed may affect the application rate in some instances, and the user may desire to control machine speed for this and other reasons.

Although various user controls have been shown and described herein, it is to be understood that other user controls may be available for a user to control the machine and row unit.

Figure 4:
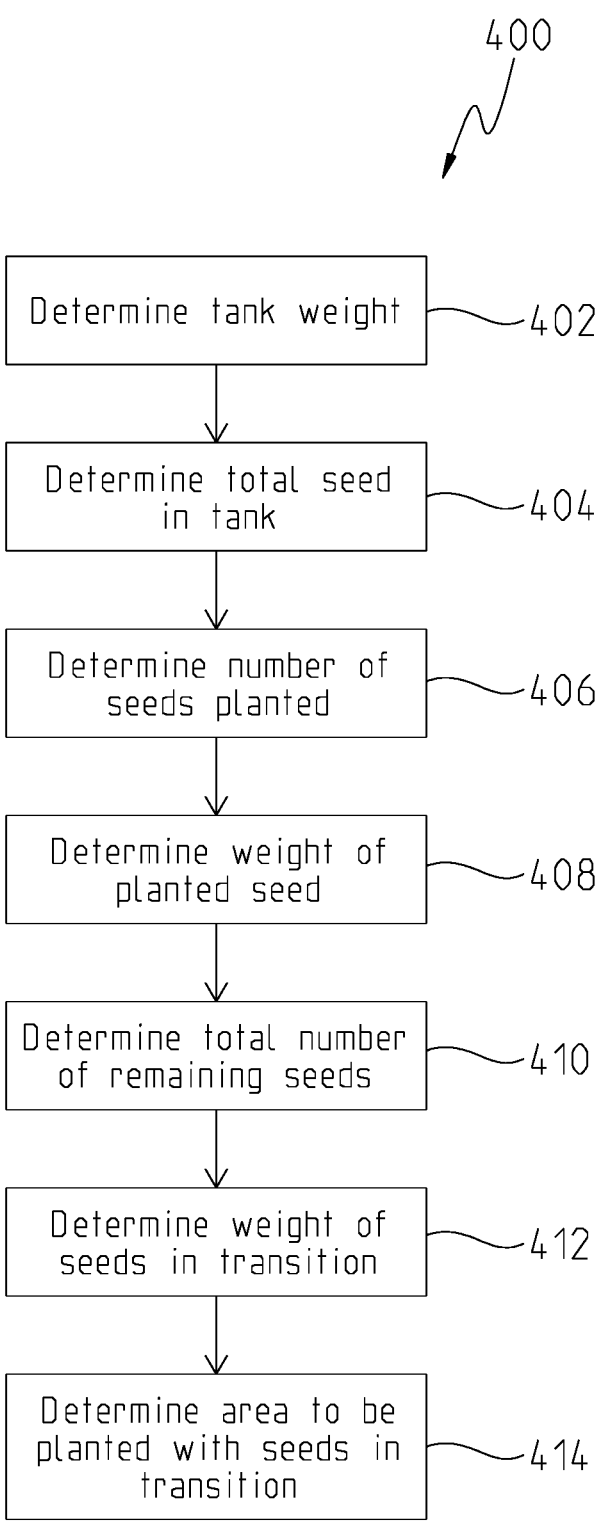
FIG. 4 is a flow diagram of an embodiment for determining an area capable of being planted with remaining product in a product distribution system of an agricultural work machine.

Referring to FIG. 4, one embodiment of a method for determining a remaining amount of seed or product in the distribution assembly 28 is disclosed. In this embodiment, the method 400 may be executable by the controller 302 by following an algorithm or control logic stored in its memory 304. The method 300 may include a plurality of blocks or steps executable by the controller 302. The blocks or steps are shown in one arrangement, but it is to be understood that one or more of the blocks or steps may be executed in a different order. Further, in other embodiments, one or more of the blocks or steps may not be executed. Further yet, one or more additional blocks or steps may be executed in a different embodiment.

Turning to the method 400, a first block 402 is executable by the controller 302 to determine a tank weight. Here, the load cell or scale 312 may be used to weigh the tank. To get an initial weight, the load cell or scale may be tared or zeroed, and then product such as seed or fertilizer may be dispensed into the tank 30. The controller 302 may get a weight reading from the load cell or scale 312 that measures the actual weight of product in the tank 30. It is to be understood that the weight of product does not include any product in the distribution assembly 28. Thus, if a mechanism 40 such as a valve 314 is provided in the system, the valve 314 may be closed. Alternatively, the blower is turned off so that seed or product is not transferred to the individual row units.

Once the product weight is measured in block 402, the method 400 may advance to block 404 where the quantity of seed or product in the tank 30 may be determined. To do so, the density of the seed or product may be known by the controller 302 or input to the controller via fourth user control 334. The product of multiplying the seed weight from block 402 by the seed density, for example, may provide the quantity of seed in the tank 30.

After this, the work operation such as planting may begin. During the operation, the seed sensors 320 on each row unit 14 may count or detect the number of seeds being planted. The sensors 320 may communicate these totals to the controller 302, which sums the totals for a total planted seed count in block 406.

In block 408, the controller 302 can determine the weight of the planted seed. Here, the controller 302 can determine the planted seed weight by finding the product of the seed density and the total planted seed count. From this calculation, the controller 302 is able to determine the weight of the seed planted during the work operation.

Advancing to block 410, the controller 302 may now determine how much product or seed remains in the tank 30, distribution hoses 42, secondary hoppers 18, and meters 20. To do so, the controller 302 may find the difference between the initial total weight of seed in the tank 30 found in block 402 and the planted seed weight found in block 408. From this, the weight of seed remaining can be determined.

In block 412, the controller 302 may request another tank weight measurement. The tank weight measurement should be less than the initial weight found in block 402 since product or seed has been planted and/or transferred into the distribution assembly 28. The weight of seed in the distribution assembly 28 can be determined by finding the difference between the weight of seed remaining in block 410 from the current tank weight. The weight of seed in the distribution assembly 28 may also be referred to as product or seed in transition as it waits to be planted.

Once the weight of seed in the distribution assembly 28 is determined in block 412, the method 400 may advance to block 414 where an area that can be planted with the seeds in the distribution assembly is determined. This can be done several ways. For example, one way to determine this is by using a desired weight per area. Another way to so is by desired seeds per area. In the former example, the area may be calculated by dividing the remaining weight of seed from block 412 by a target application rate. The target application rate may be defined as pounds per acre, for example. Once the area is determined in block 414, the controller 302 knows how much of the field can be planted by using only the seed in the distribution assembly 28, i.e., the nozzle area 39, distribution hoses 42, secondary hoppers 18, and meters 20.

In the present application, a process for dynamically determining a product or seed density is disclosed. Here, the machine performs a work operation over an acre. For example, the machine may plant seed over an acre. Prior to the work operation, the controller 302 may receive a weight of the tank 30 filled with seed so that the controller 302 knows how much seed is in the tank prior to the work operation. After the acre is planted, the seed sensors 320 may communicate to the controller 302 the total number of seeds planted in the acre. The controller 302 may receive a new tank weight from the load cell or scale 312. From this, the controller 302 can determine how much seed weight has been planted by find the difference between the original seed weight and the current seed weight. Further, the seed density may be found by dividing the total number of seeds planted by the planted seed weight. While an acre is described as being planted, the seed density may be found over any given area planted.

Figure 5:
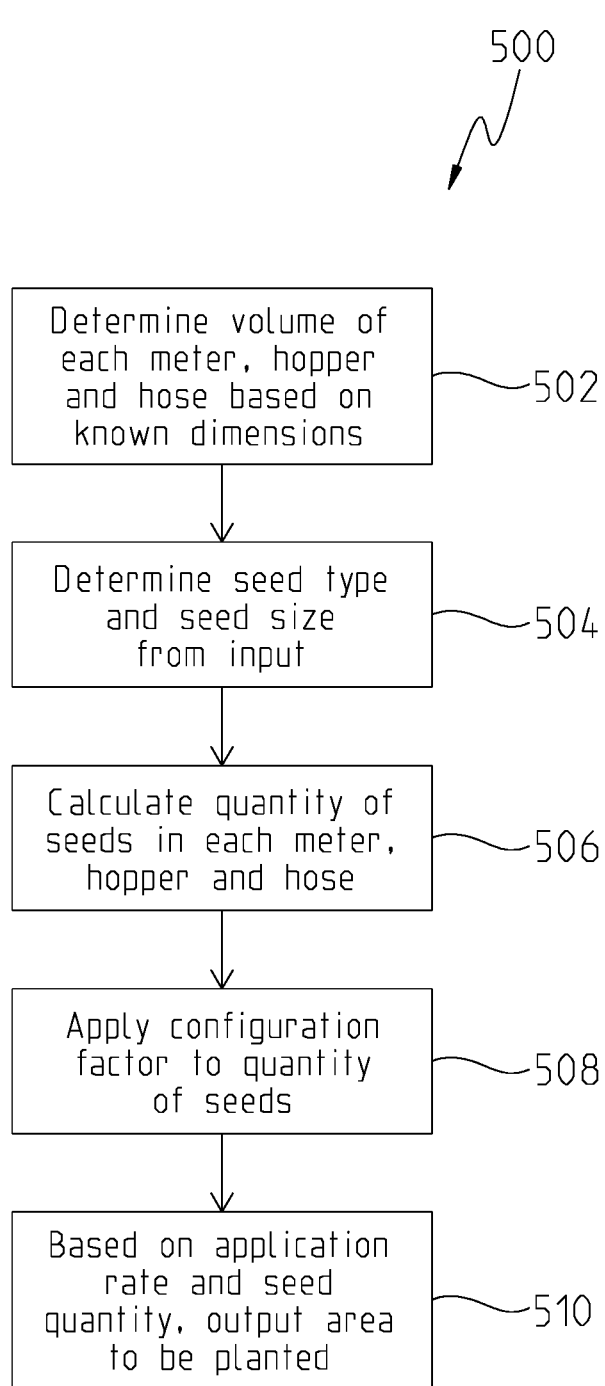
FIG. 5 is a flow diagram of another embodiment for determining an area capable of being planted with remaining product in a product distribution system of an agricultural work machine.

Referring now to FIG. 5, another method is disclosed for determining an area to be planted based on the amount of product or seed remaining in the distribution assembly 28. In this method, however, the controller 302 is without the benefit of having a load cell or scale 312 capable of weighing the tank 30. In this method 500, the controller 302 may be provided the dimensions of every distribution hose (e.g., length, diameter), secondary hopper (e.g., width, height, length), and meter. From these dimensions, the controller 302 may determine the volume of each distribution hose, secondary hopper and meter in block 502. For sake of this block, the controller 302 may receive the dimensions from the user via a user control or this information may be received in an algorithm or other control logic.

Once the volume is determined in block 502, the method may advance to block 504 where the controller 302 determines the type of product or seed and its corresponding size. This may be input to the controller 302 via the third user control 332. Once the size of the product or seed is known, the controller 302 may calculate or otherwise determine the quantity of product or seed that is in the distribution hoses 42, secondary hoppers 18 and meters 20 in block 506.

Since it is possible the distribution hoses 42, secondary hoppers 18, and meters 20 may not be full of product or seed, a configuration factor may be applied to the quantity of seeds in block 508. The configuration factor may be collected over time or it may be input by the user via a user control. The configuration factor may also be defined in a lookup table 326 which is retrievable by the controller 302 from its memory 304. The configuration factor may be defined as a percentage, for example. In one instance, the configuration factor may be defined between 0-25%. In another example, the configuration factor may be defined between 0-20%. In a further example, the configuration factor may be defined between 0-15%. In yet another example, the configuration factor may be defined between 0-10%. In yet a further example, the configuration factor may be defined between 0-5%. If the configuration factor is determined based on collected data, it may be dependent upon the size of seed or product being planted. Thus, size of seed, hose size, hose length, and hopper size may be factors in determining the configuration factor. Further, the population of seed may be another factor in determining the configuration factor. In one example, the user may input the seed type via the third user control 332 and the seed population via the fifth user control 336. Thus, from the volume of the distribution hoses, secondary hoppers, and meters as well as the configuration factor, the amount of seeds or product available in the hoses, hoppers and meters can be approximately estimated in block 508.

Following the execution of block 508, the area that can be planted based on the amount of product or seed determined in block 508 may be determined in block 510. The application rate, quantity of seeds, and seed density may be used as described above to find the area that can be planted.

Figure 6:
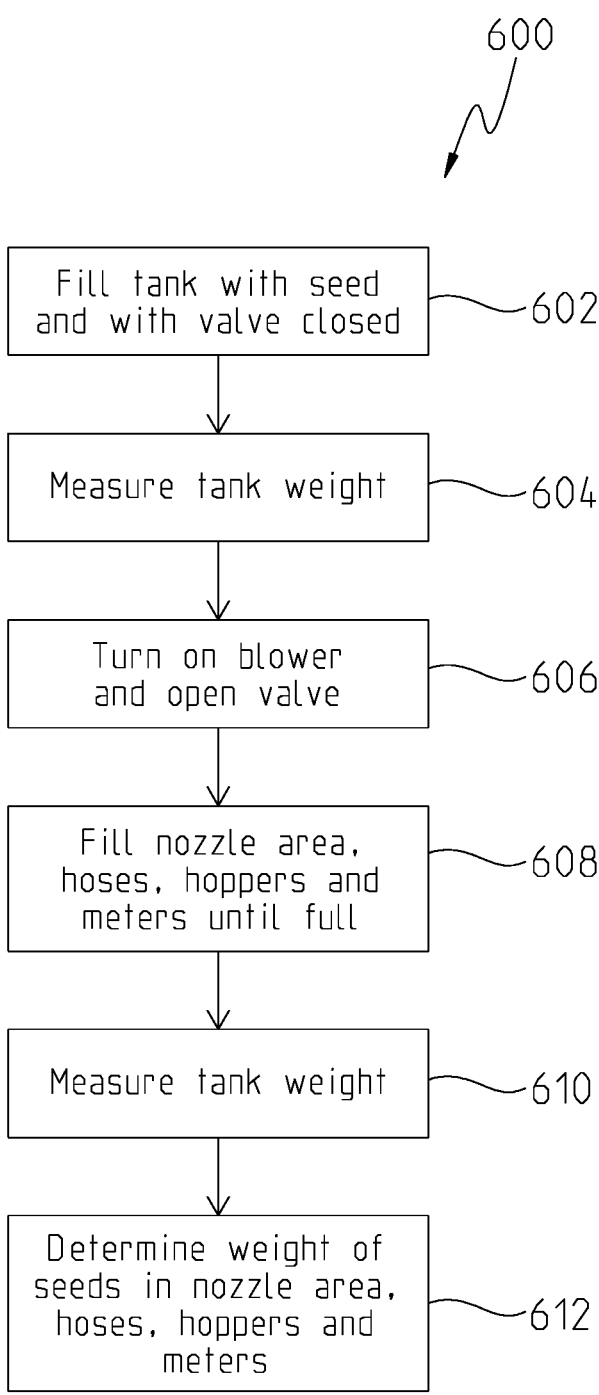
FIG. 6 is a flow diagram of an embodiment for determining a weight of product in a product distribution system of an agricultural work machine.

Turning to FIG. 6, another embodiment of a control method or process is disclosed. The control method 600 may be executable by the controller 302 in order to determine how much product remains in the distribution assembly 28 (i.e., the nozzle area 39, distributions hoses 42, hoppers 18, and meters 20). The control method 600 may be executed as a static method with the use of a mechanism 40 such as a valve 314 or electronic gate. In a first block 602 of the method 600, the tank 30 may be filled with product such as seed, fertilizer, chemical granulates, etc. The controller 302 can close the mechanism 40 as product fills the tank 30 in block 602. In this way, product does not fill the nozzle area 39 of the tank 30.

Once the product fills the tank 30, the method 600 can advance to block 604 where the tank weight is measured. This can be done via a load cell or scale 312. The empty tank weight may be known by the controller 302, or the scale 312 may be tared or zeroed prior to product being filled in the tank 30. In any event, the weight of product in the tank 30 can be determined in block 604.

Once the product weight is determined in block 604, the method 600 can advance to block 606 where the controller 302 may open the mechanism 40 (e.g., valve 314) and turn on the blower or fan 308. As product begins to flow into the nozzle area 39, an air stream from the blower 308 can collect and transfer product to each row unit. As this happens, product can flow through the distribution hoses 42 and fill the secondary hoppers 18 and meters 20 in block 608. In blocks 606 and 608, the work operation has not yet begun.

The tank weight can be measured again in block 610 where a portion of the product has been discharged from the tank 30 and into the distribution hoses 42, hoppers 18, and meters 20. Once the new tank weight is determined in block 610, the weight of product in the distribution hoses 42, hoppers 18, and meters 20 can be determined in block 612 as the difference between tank weight from block 604 and the tank weight from block 610. Once the product weight in the distributed hoses 42, hoppers 18 and meters 20 is known, the area to be planted by this product can now be determined in a similar manner as described above.

In this control method 600, the amount of product in the nozzle area 39 may not be known or accounted for in the product weight found in block 612. Nonetheless, the volume of the nozzle area 39 may be known or determined. As a result, based on the size and density of the product, the amount of product or weight of product in the nozzle area 39 may be determined. As such, the product weight in the nozzle area 39 can be summed with the product weight found in block 612. Thus, the control method 600 is capable of determining the product weight in the distribution assembly 28, and the area to be planted by the product in the distribution assembly 28 can therefore be determined.

Moreover, in addition to determining how much seed is required to fill the distribution lines, hoppers and meters, when the tank is filled for the last time to finish off or complete a planting operation in a field, a weight may be provided to the tendering system to only put in as much seed or other material that is required to complete the planting operation (plus any margin amount that the user might specify as a threshold). In doing so, this would render any mechanism above the nozzles as unnecessary.

Figure 7:
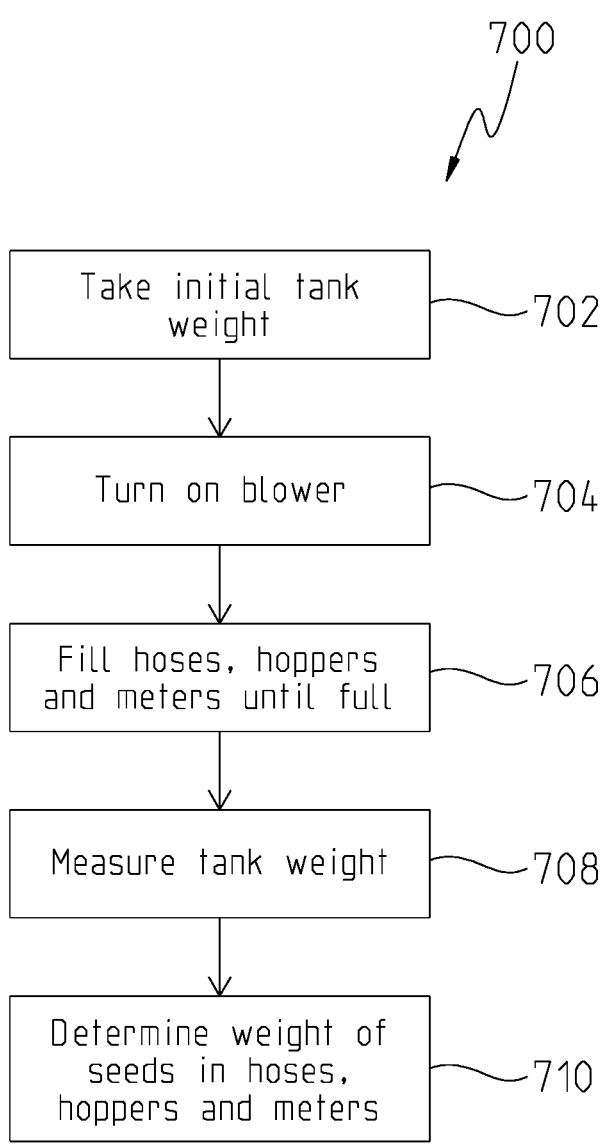
FIG. 7 is a flow diagram of an embodiment for determining a weight of product in a product distribution system of an agricultural work machine.

Referring to FIG. 7, a further embodiment of the present disclosure is illustrated. Here, a control method 700 for determining an amount of product remaining in the distribution assembly 28. Unlike the control method 600 of FIG. 6, the method of FIG. 7 may be executed with the system not including a mechanism 40 or valve 314 capable of being opened and closed. Thus, any product added to the tank 30 may flow into the nozzle area 39 without a mechanism 40 being available to regulate the flow.

Before the tank 30 is filled, the load cell or scale 312 can be tared or zeroed. After this, the method 700 can begin with block 702 where the tank 30 is filled with product. In block 702, the controller 302 operably controls the blower or fan 308 to be shut off. Further, once product is supplied to the tank 30, the tank weight can be retaken in block 702. The weight in block 702 therefore corresponds with an initial product weight.

Once the initial product weight is determined, the method 700 can advance to block 704 where the controller 302 turns on the blower or fan 308 so that the product is transferred into the distribution hoses 42, secondary hoppers 18, and meters 20. At this point, the method 700 advance to block 706 in which the distribution assembly 28 is primed with product for a work operation.

In block 708, the tank weight can be measured again based on the amount of product that remains after the hoses 42, secondary hoppers 18, and meters 20 are filled. Once the new tank weight is determined, the product weight in the distribution hoses 42, secondary hoppers 18, and meters 20 can be determined based on the difference between the initial tank weight in block 702 and the new tank weight in block 708. Once the product weight in the distributed hoses 42, hoppers 18 and meters 20 is known, the area to be planted by this product can now be determined in a similar manner as described above.

In this particular system, there is no mechanism 40 or valve 314 capable of being closed. Thus, once the distribution system is primed, the only way to prevent additional product from being transferred from the tank 30 through the distribution hoses 42 to the row units is to shut off the blower or fan 308. Once the blower 308 is shut off, the product that is located in the secondary hoppers 18 and meters 20 of each row unit 14 is planted or otherwise discharged from the row unit in a work operation. Product left in the distribution hoses 42, however, may not be planted or discharged by the row units since it is not located in the secondary hoppers. Thus, in this control method 700, the amount of product that remains in the distribution hoses 42 may not be known or accounted for in the area to be planted by the product determined in block 710. Nonetheless, the amount of product in the hoses 42 is likely relatively small compared to the amount of product in the secondary hoppers 18 and meters 20.

Figure 8:
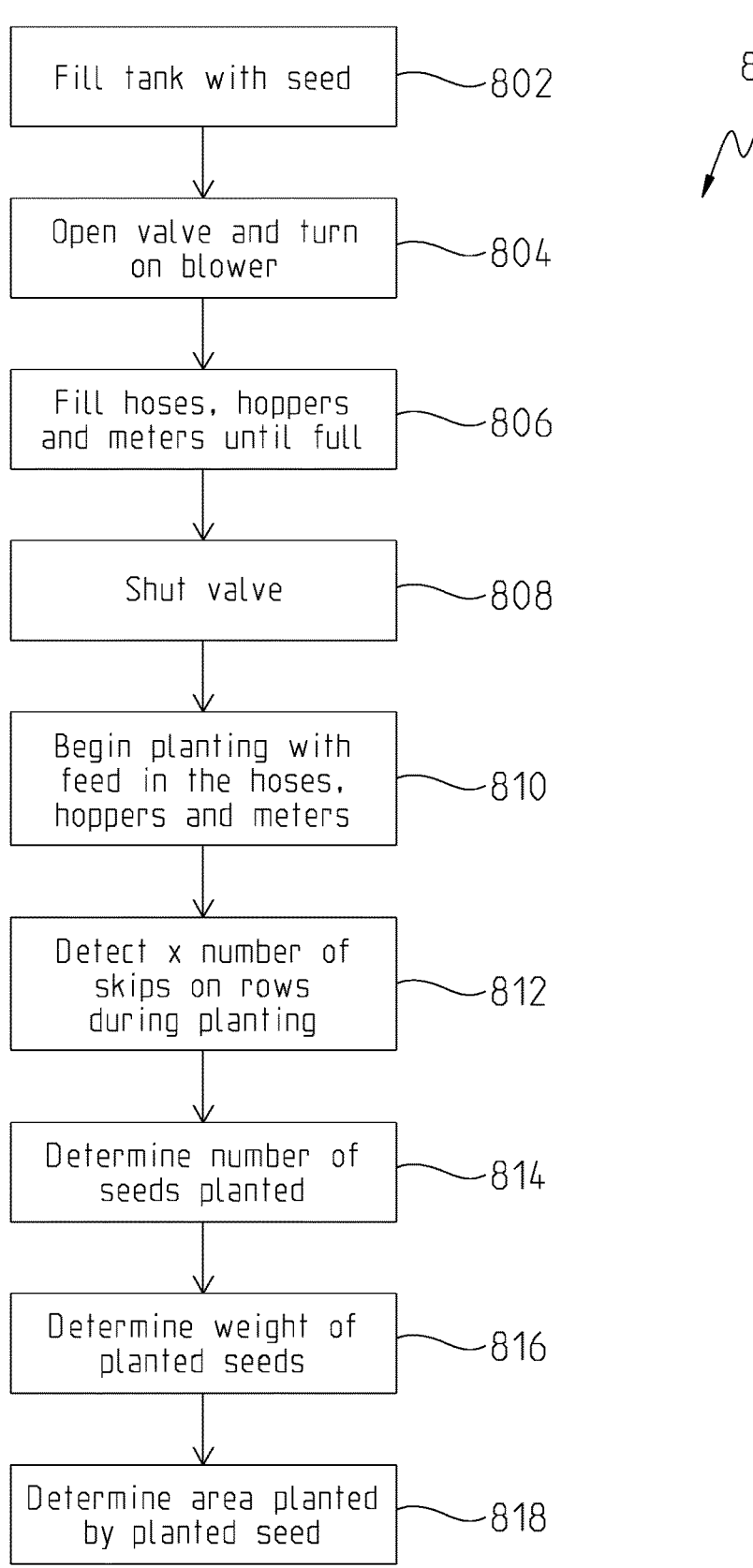
FIG. 8 is a flow diagram of a further embodiment for determining an area capable of being planted with remaining product in a product distribution system of an agricultural work machine.

An experiential control method is shown in FIG. 8. Here, the control method 800 may determine an amount of product remaining in the distribution assembly 28 based on an experiential or empirical data. In this method 800, there may not be any tank scale or load cell 312 for measuring tank weight. Instead, the method 800 may begin with block 802 in which the tank 30 is filled with product such as seed, fertilizer, chemical granulates, and the like. Once the tank is filled to a desirable level, the controller 302 may open the mechanism 40 or valve 314 and activate the blower or fan 308 in block 804. As this is done, product may be transferred from the tank 30 through the distribution hoses 42 to fill the secondary hoppers 18 and meters 20 (or meter assemblies) of each row unit 14 on the machine in block 806.

Once it is determined the secondary hoppers 18 and meters 20 are filled, in block 808 the controller 302 may shut the mechanism 40 or valve 314. With the blower still running, the control method 800 may continue in block 810 as the work operation (e.g., planting operation) begins with the product located in the distribution assembly 28 (e.g., the distribution hoses 42, hoppers 18 and meters 20).

During the work operation, the controller 302 may detect a skip on row whereby a product is not discharged from the meter as expected. The seed sensors 320 may detect a skip and report it to the controller 302. Other means may be used for detecting a skip on row. In any event, in block 812, the control algorithm or logic may be set to identify when a certain number, x, of skip on rows occurs during the work operation. Once the threshold number, x, of skip on rows is detected in block 812, the method 800 may advance to block 814 where the controller 302 determines from the seed sensors 320 how much product has been discharged or planted from the meters 20.

From the result in block 814, the product quantity in the distribution assembly 28 is learned, and from this the planted weight of product can be determined in block 816 as a function of product density. Further, in block 818, the area that can be planted based on the product quantity of block 814 and planted weight of product in block 818 may be determined.

From this method 800, a user or the control system 300 can learn when to open and close the mechanism 40 or valve 314 based on the product quantity that is planted before the threshold number, x, of skip on rows is achieved. For example, if the threshold number, x, is set at five (5) skip on rows, the control logic may be executable such that as the number of skip on rows reaches a number approaching the threshold five (e.g., 3 or 4 skip on rows), the controller 302 may automatically open the mechanism 40 or valve 312 to allow product to flow from the tank 30 to the different row units until the distribution assembly 28 is primed again.

Based on the learned value of the product quantity that can be planted before product begins to run dry in the distribution assembly, the amount of area or acreage that can be planted with the amount of product is learned. Thus, the method 800 of FIG. 8 may be performed until the product quantity or area planted reaches a threshold limit, and then the controller 302 opens the mechanism 40 or valve 312 to refill the row units for more planting, for example. The benefits of this system is such that a tank scale or load cell 312 is not required. Further, the product quantity determined in block 814 may correspond relatively accurately to the product quantity in the entire distribution assembly 28 (i.e., the nozzle area 39, the distribution hoses 42, the secondary hoppers 18, and the meters 20).

The method 800 of FIG. 8 is described in relation to the entire machine including all of the row units coupled thereto. However, the method 800 can be adapted to detect only the product quantity planted on an individual row unit.

Figure 9:
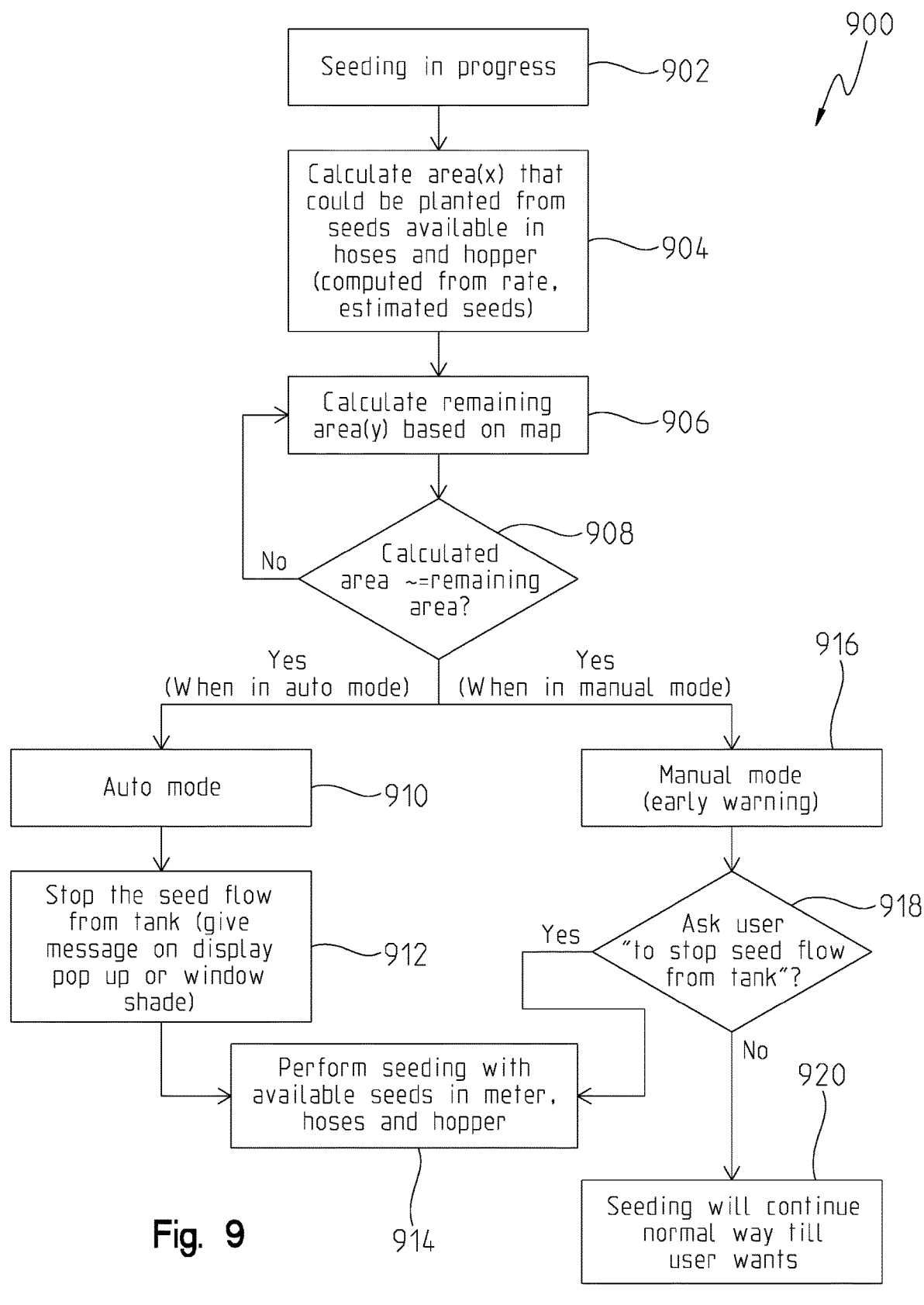
FIG. 9 is a flow diagram of a control process for controlling a flow of product in a product distribution system of an agricultural work machine.

Referring now to FIG. 9, a method is provided for performing a seeding or planting operation with the product in the distribution assembly to reduce the amount of product left in the distribution assembly following the operation. The method 900 may utilize any of the aforementioned control methods described in FIGS. 4-8. Here, the method 900 may be executed by the controller 302, which may execute the method 900 as part of an algorithm or control logic stored in the memory 304 thereof. In any case, the method 900 may include a plurality of blocks or steps which are executable. To begin, in block 902, the agricultural machine may be performing a work operation such as planting or seeding. As the operation progresses, product such as seed may be continuously fed from a tank 30 into a nozzle area 39 where it is collected and transferred by an air stream from a blower 308 to a row unit 14. The machine may include a plurality of row units, each of which may include a secondary hopper 18 and meter assembly 20 as described above. The meter or meter assembly 20 may receive product from the secondary hopper 18, and take individual product or seed and place it in a furrow formed by a furrow opener 22. The operation may take place in a field having an overall defined area, A. A field map 324 of the field may be stored by the controller 302 in its memory 304, of the field map 324 may be communicated via GPS 322 or from some other remote location. In any event, the controller 302 may receive a layout of the field and track where product has been deposited in the field.

A mechanism 40 such as a valve 314, gate, or other device may be utilized to prevent product from flowing from the tank 30 into the nozzle area 39. The controller 302 may control the opening and closing of the mechanism 40, as described previously. For instance, the controller 302 may allow for product to prime the distribution assembly 32 (i.e., the nozzle area 39, distribution hoses 42, secondary hoppers 18, and meters (or meter assemblies) 20) and then close the mechanism 40 until the product in the distribution assembly 28 is used. At that time, the controller 302 may open the mechanism 40 to allow more product to fill and prime the distribution assembly 28.

In block 904, the controller 302 is capable of determining an amount of product that is in the distribution assembly 28 and how much area, X, of the field may be planted with this amount of product. The manner in which the area, X, is determined can be based on the control logic executable by the controller 302. Again, this may be done by any of the previously described methods disclosed in FIGS. 4-8. Once the area, X, is known or at least estimated by the controller 302 in block 904, the controller 302 may next refer to the field map 324 in block 906 to determine the remaining area, Y, of the field that needs to be planted.

In block 908, the controller 302 may then compare the area, X, that can be planted by the product remaining in the distribution assembly 28 to the remaining area, Y, that needs to be planted. If the remaining area, Y, is greater than the area, X, then the controller 302 will return to block 906 where it continues to evaluate and determine the remaining area, Y, to be planted. As the work operation continues, the remaining area, Y, to be planted will decrease. If, however, the remaining area, Y, is approximately the same or less than the area, X, then the controller 302 may advance to block 910 or 916.

In block 910, the controller 302 is operating an automated mode. A user may set the control method 900 to the automated mode via a user control, for example. With the method 900 operating in an automated mode, the controller 302 may shut the mechanism 40 or valve 314 in block 912 to prevent additional product from flowing from the tank 30 into the nozzle area 39. The controller 302 may send an alert to a user display or screen in a cab (not shown) of the machine to alert the user that the mechanism 40 is closed and the remainder of the operation will be done with only the product currently disposed in the distribution assembly 28. As this is done, the machine may continue the work operation in block 914 by performing the planting or seeding (or fertilizing, etc.) with the product in the nozzle area 39, distribution hoses 42, secondary hoppers 18, and meters 20.

If, however, the control method 900 advances from block 908 to block 916, the control method 900 is being executed in a manual or partial manual mode. In this case, the controller 302 may send an alert in block 918 to the user via a display to request permission to shut the mechanism 40. If the user commands the controller 302 to not shut the mechanism 40, then the method 900 proceeds to block 920 where the work operation continues per normal until the user communicates differently.

If, however, the user instructs the controller 302 to close the mechanism 28 in block 918, the control method can advance to block 914 where the rest of the work operation will continue with only the product remaining in the distribution assembly 28.

At the conclusion of block 914, the control method 900 may complete the work operation with very little or no product remaining in the distribution assembly 28. In view of this, the effort to clean the hoses, hoppers and meters can be minimized and the remaining product in the hoses, hoppers and meters can be significantly reduced. Moreover, the user no longer has to collect and transport large amounts of leftover product from the hoses and row units after the work operation.

Another advantage to the control method is that it can be executed with minimal hardware additions to the system. The mechanism 40, in the form of a valve, gate, or the like, may be incorporated into the tank above the nozzle area 39. Other hardware, however, may already exist on the system. Further, the control method can be executed without requiring a tank scale system to measure the weight of product in the tank. Instead, methods have been proposed herein which determine the amount of product in the distribution assembly without the benefit of a tank scale system.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. An agricultural work machine, comprising:
   a frame;
   a tank coupled to the frame and configured to store a product, the tank including a nozzle portion;
   a row unit coupled to the frame, the row unit comprising a hopper and a meter assembly;
   a product distribution line coupled between the nozzle portion of the tank and the hopper;
   a blower operably controlled to provide an air flow through the distribution line to transfer product from the tank to the row unit;
   a mechanism located in the tank above the nozzle portion, the mechanism operably controlled between an open position and a closed position; and
   a controller for operably controlling the blower and mechanism, wherein the controller comprises control logic which is executable by the controller to:
   determine a total weight of product in the tank before performing a work operation;
   perform a first portion of the work operation by controlling the blower to transfer product from the tank to the row unit;
   determine how much product was used to complete the first portion of the work operation; and
   determine how much product remains in the distribution line, the hopper and the meter assembly after completing the first portion;
   wherein, in the open position, the product in the tank flows through the mechanism into the nozzle portion; and
   wherein, in the closed position, the mechanism blocks the product in the tank from flowing into the nozzle portion.

2. The work machine of claim 1, wherein the nozzle portion is in fluid communication with the blower, the nozzle portion comprising an inlet and an outlet such that the air flow enters through the inlet, collects product in the nozzle portion, and transfers the product into the distribution line via the outlet.

3. The work machine of claim 1, further comprising a weight measuring device in communication with the controller, the weight measuring device configured to measure the weight of product in the tank and communicate the weight to the controller.

4. The work machine of claim 1, further comprising a field map disposed in communication with the controller, wherein the control logic is executable by the controller to determine from the field map a remaining area to be worked after the first portion of the work operation is completed.

5. The work machine of claim 4, wherein, based on an amount of product remaining in the distribution line, the hopper and the meter assembly, the control logic is executable by the controller to:

determine a first area of the field which is workable by using only the remaining product in the distribution line, the hopper and the meter assembly;

compare the first area to the remaining area; and control the mechanism to the closed position if the first area is the same as or less than the remaining area.

6. The work machine of claim 1, wherein the controller comprises control logic which is executable by the controller to:

calculate a total volume based on dimensions of the distribution line, the hopper and the meter assembly;

receive an input related to a density of the product stored in the tank;

determine a quantity of product based on the total volume and density;

apply a predetermined configuration factor to the quantity of product; and determine an amount of product available in the distribution line, hopper and meter assembly.

7. An agricultural work machine configured to deposit a product on a field, comprising:

a frame;

a tank coupled to the frame and configured to store the product;

a row unit coupled to the frame, the row unit comprising a hopper and a meter assembly;

a distribution line coupled between the tank and the hopper;

a control system comprising a controller and control logic, the control logic being executable by the controller to perform a work operation of depositing the product on the field; and a blower operably controlled by the controller to provide an air flow through the distribution line to transfer product from the tank to the row unit;

a nozzle portion of the tank disposed in fluid communication with the blower; and a mechanism located in the tank above the nozzle portion, the mechanism operably controlled between an open position and a closed position;

wherein, in the open position, the product in the tank flows through the mechanism into the nozzle portion;

wherein, in the closed position, the mechanism blocks the product in the tank from flowing into the nozzle portion;

wherein, the controller operably executes the control logic to determine an amount of product in the distribution line, the hopper and the meter assembly at any given time; and wherein the controller determines the amount of product in the distribution line, the hopper and the meter assembly by executing the control logic by:

receiving a first product weight of the product in the tank from a tank scale before executing the work operation;

after completing a first portion of the work operation, receiving a quantity of product deposited from the row unit via a sensor;

determining a second product weight related to the quantity of product deposited from the row unit as a function of a density of the product;

determining a third product weight based on a difference between the first product weight and the second product weight;

receiving a current weight of the tank from the tank scale; and determining a remaining product weight based on a difference between the third product weight and the current weight, the remaining product weight being the weight of product located in only the distribution line, hopper and meter assembly.

8. The work machine of claim 7, wherein the control logic is executable by the controller to determine an area of the field of which the work operation may be performed based only on the amount of product located in the distribution line, the hopper and the meter assembly.

9. The work machine of claim 7, further comprising:

a nozzle portion of the tank disposed in fluid communication with the blower; and a mechanism located in the tank above the nozzle portion, the mechanism operably controlled between an open position and a closed position;

wherein, in the open position, the product in the tank flows through the mechanism into the nozzle portion;

wherein, in the closed position, the mechanism blocks the product in the tank from flowing into the nozzle portion.

10. The work machine of claim 7, wherein the control system comprises:

a plurality of user controls disposed in communication with the controller, the plurality of user controls being controllable by a user to communicate at least one of an application rate, an instruction to control a valve or gate, an instruction to control the blower, a product type, a product density, and a product population; and at least one sensor disposed in communication with the controller, the at least one sensor configured to detect a level of product in the hopper or when product is deposited from the row unit.

11. The work machine of claim 7, wherein the controller stores the determined amount of product in the nozzle area, the distribution line, hopper and meter assembly in its memory.

12. The work machine of claim 7, wherein during another work operation, the control logic is executable by the controller to:

control the mechanism in its closed position;

receive a continuous count of product being deposited from the row unit via the sensor; and control the mechanism to its open position when the count is within a range or percentage of the total quantity of product.

13. An agricultural work machine configured to deposit a product on a field, comprising:

a frame;

a tank coupled to the frame and configured to store the product;

a row unit coupled to the frame, the row unit comprising a hopper and a meter assembly;

a distribution line coupled between the tank and the hopper;

a control system comprising a controller and control logic, the control logic being executable by the controller to perform a work operation of depositing the product on the field; and a blower operably controlled by the controller to provide an air flow through the distribution line to transfer product from the tank to the row unit;

a nozzle portion of the tank disposed in fluid communication with the blower; and a mechanism located in the tank above the nozzle portion, the mechanism operably controlled between an open position and a closed position;

wherein, in the open position, the product in the tank flows through the mechanism into the nozzle portion;

wherein, in the closed position, the mechanism blocks the product in the tank from flowing into the nozzle portion;

wherein, the controller operably executes the control logic to determine an amount of product in the distribution line, the hopper and the meter assembly at any given time; and wherein the controller determines the amount of product in the distribution line, the hopper and the meter assembly when executing the control logic by:

controlling the mechanism to its closed position;

receiving a first weight of the tank from a tank scale after product is loaded in the tank and the nozzle portion, the distribution line, the hopper and the meter assembly are substantially empty of product;

controlling the mechanism to its open position to allow product to flow from the tank into the nozzle portion;

activating the blower to transfer product from the nozzle portion through the distribution line into the hopper and meter assembly;

once the hopper and meter assembly are full of product, receiving a second weight from the tank scale; and determining the amount of product in the distribution line, the hopper and the meter assembly based on a difference between the first weight and the second weight.

14. An agricultural work machine configured to deposit a product on a field, comprising:

a frame;

a tank coupled to the frame and configured to store the product;

a row unit coupled to the frame, the row unit comprising a hopper and a meter assembly;

a distribution line coupled between the tank and the hopper;

a control system comprising a controller and control logic, the control logic being executable by the controller to perform a work operation of depositing the product on the field; and a blower operably controlled by the controller to provide an air flow through the distribution line to transfer product from the tank to the row unit;

wherein, the controller operably executes the control logic to determine an amount of product in the distribution line, the hopper and the meter assembly at any given time wherein the controller determines the amount of product in the distribution line, the hopper and the meter assembly when executing the control logic by:

receiving a first weight of the tank from a tank scale after product is loaded in the tank and the distribution line, the hopper and the meter assembly are substantially empty of product;

activating the blower to transfer product from the tank through the distribution line into the hopper and meter assembly;

once the hopper and meter assembly are full of product, receiving a second weight from the tank scale; and determining the amount of product in the distribution line, the hopper and the meter assembly based on a difference between the first weight and the second weight.

* * * * *